(12) United States Patent
Doyle, III et al.

(10) Patent No.: US 7,264,783 B1
(45) Date of Patent: Sep. 4, 2007

(54) DEVICE AND METHOD FOR NEUTRALIZING CHEMICAL AGENTS

(75) Inventors: Edward F. Doyle, III, Phoenix, MD (US); Alan T. Seitzinger, Abingdon, MD (US); John T. Lawton, Killen, AL (US); Jerry W. Owen, Tuscumbia, AL (US); Grady Lynn Holt, Florence, AL (US); Joseph T. Johnson, Signal Mountain, TN (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 900 days.

(21) Appl. No.: 10/617,275

(22) Filed: Jul. 10, 2003

(51) Int. Cl.
*A01M 13/00* (2006.01)
(52) U.S. Cl. ..................................................... 422/237
(58) Field of Classification Search ................ 422/237; 588/900
See application file for complete search history.

(56) References Cited

U.S. PATENT DOCUMENTS 5,998,691 A * 12/1999 Abel et al. .................. 588/318

* cited by examiner

*Primary Examiner*—Edward M. Johnson
(74) *Attorney, Agent, or Firm*—Ulysses John Biffoni

(57) ABSTRACT

The Chemical-agent Access and Neutralization System (CANS) of the present invention is a small, portable, single-use, disposable chemical treatment apparatus that is used to access and treat Chemical Agent Identification Set (CAIS) ampoules, bottles and/or containers that contain vesicant agents, or chemical warfare agents such as mustard or Lewisite. The apparatus and method of use of the present invention provides a resultant treatment residue that remains totally contained in the CANS treatment container and is safe for disposal. The CANS treatment container can be over packed into a Department of Transportation (DOT) certified shipping container, and shipped to permitted hazardous waste management facilities for ultimate disposal.

8 Claims, 3 Drawing Sheets

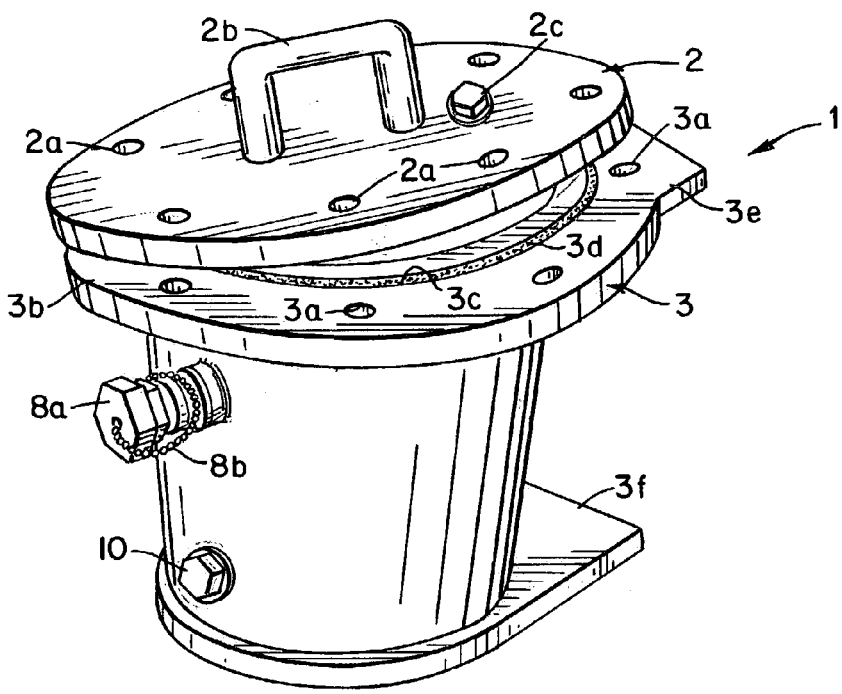
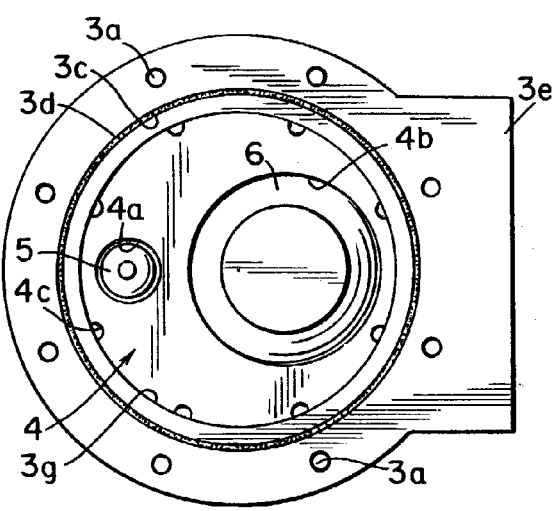
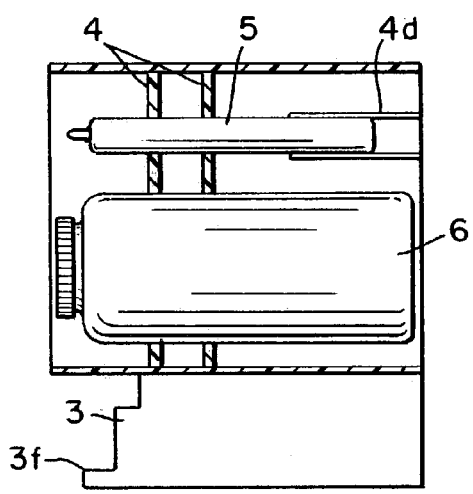
Fig.1
Fig.1a
Fig.1b

DEVICE AND METHOD FOR NEUTRALIZING CHEMICAL AGENTS

STATEMENT OF GOVERNMENT INTEREST

The invention described herein may be manufactured, used and licensed by or for the United States Government.

FIELD OF THE INVENTION

The present invention is directed to containment, neutralization and disposal of chemical contaminants present in Chemical Agent Identification Sets (CAIS). The system of the present invention allows for rapid monitoring and treatment of CAIS without the need for large-scale neutralization apparatus.

BACKGROUND OF THE INVENTION

Over 160,000 chemical agent identification sets (CAIS) were produced between 1928 and 1969. These sets were used to train soldiers to identify chemical warfare agents in the field. Current law allows CAIS to be held without treatment at specific sites in the United States. However, state policies and public concern often preclude such storage.

A rapid response system (RRS) has been developed and used to receive, contain, characterize, monitor and treat recovered CAIS from burial sites. The purpose of the RRS was to provide safe and effective containment and disposal of the CAIS. The RRS included two trailers and a mobile analytical support platform (MASP) for analyzing the waste and treatment residues on the CAIS sites. The MASP also provided air quality management monitoring devices, alarms, impingers and protocol for recording contaminants in the air. Additional trailers have been used for support equipment and administrative offices. Once treated with the appropriate decontaminants, remaining neutralized materials are transported to a commercial waste treatment facility for ultimate disposal.

While the RRS system is beneficial for large CAIS recovery sites it has been cost prohibitive for smaller CAIS quantity sites. In addition, there is also a need to address emergency situations where quick reduction of agent contamination/hazard is imminently necessary to protect the public. Therefore, there is a need to rapidly reduce chemical warfare agent hazard associated with CAIS at smaller recovery sites and in emergency situations that is provided for by the present invention as described below.

SUMMARY OF THE INVENTION

It is therefore an object of the present invention to provide a Chemical-agent Access and Neutralization System (CANS) container that is capable of rapidly accessing and neutralizing chemical contaminants without harming the environment.

It is another object of the present invention to provide a Chemical-agent Access and Neutralization System that is economical and provides an efficient manner of neutralizing chemical contaminants.

It is yet another object of the present invention to provide a unique break system that allows chemical contaminants and neutralizing agents stored within a closed container to be intermixed without harm to the environment.

It is yet another object of the present invention to provide a container having a flanged lid that is hermetically sealed when in use, and capable of easy removal for placement/removal of contaminants and reagents within the container.

It is yet another object of the present invention to provide a torque mechanism for fastening the flanged lid to the body of the container to facilitate a proper seal between the container and the environment.

It is yet another object of the present invention to provide a container that allows admixing of the chemicals by placement of the container in different positions.

It is yet another objective of the present invention to monitor reaction conditions within the container without contaminant leakage to the environment.

These and other objectives are described below.

BRIEF DESCRIPTION OF THE DRAWINGS

FIG. 1 shows the Chemical-agent Access and Neutralization System (CANS) container in an open position.

FIG. 1a shows the interior of the Chemical-agent Access and Neutralization System (CANS) container.

FIG. 1b shows an alternate embodiment of the cradle.

DETAILED DESCRIPTION OF THE EMBODIMENTS

Figure 1C:
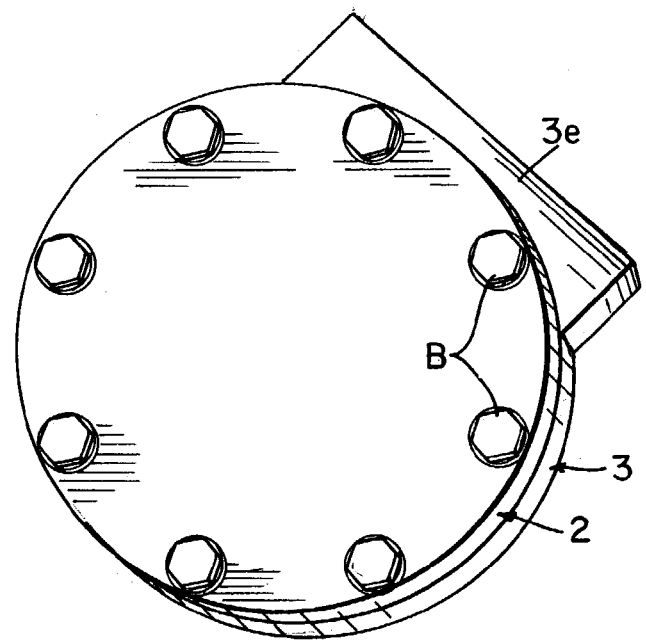
FIG. 1c shows the Chemical-agent Access and Neutralization System (CANS) container in a closed configuration.

1. System Description:

As shown in FIG. 1, the Chemical-agent Access and Neutralization System (CANS) of the present invention includes a container 1 that provides containment for neutralization treatments of chemical contaminants. Container 1 is preferably constructed of inert plastics, however other materials suitable for containment and neutralization of contaminants are also within the scope of the present invention. Kynar® is a preferred thermoplastic material for container 1 because it is also translucent allowing visual confirmation when internal reagents are released. A preferred method of making container 1 is via injection molding. FIG. 1 shows the container 1 in an open position. In a preferred embodiment, container 1 has a flanged lid portion 2 and a body portion 3. The flanged lid portion 2 is configured with a plurality of apertures 2a positioned circumferentially around the outer edge of flanged lid portion 2. Lid portion 2 also includes a handle 2b to allow container 1 to be moved, as will be discussed below. Lid portion 2 also includes at least one sample valve 2c through which a sample probe can be inserted so that reaction conditions within container 1 can be measured and/or monitored. Exemplary sample probes include pressure transducers. Sample valve 2c maintains an air tight/contaminant impermeable seal both in its closed position and when a sample probe is inserted into container 1 through sample valve 2c. The body portion 3 includes a plurality of apertures 3a positioned circumferentially around the outer edge of a flange section 3b. The plurality of apertures 2a align with apertures 3a when lid portion 2 is placed upon body portion 3. In a preferred embodiment, this arrangement of apertures is threaded to permit flanged lid 2 to be hermetically sealed against body portion 3 using bolts.

The flanged section 3b of body portion 3 also includes a groove 3c fitted with an o-ring 3d. The o-ring 3d further provides for an air-tight/contaminant impermeable seal when container 1 is closed. Of course, the use of threaded bolts with corresponding apertures 2a and 3a is only one preferred method of sealing the lid 2 to the body 3. Other methods of sealing containers are well known to those of skill in the art and it is not intended to limit the invention to the preferred embodiment described here. For example, clamps similar to those used to seal drums or a Grayloc® seal design with clamp can be used to provide an even pressure around the circumference of the lid in lieu of bolts. Alternative sealing materials such as Teflon® and metal gaskets have also been found suitable. Moreover, alternative designs to a flat lid can also be used; for example, dome-shaped lids can be used to optimize strength. The body portion 3 includes upper and lower rims 3e and 3f, which are configured to perform as stabilizing legs as will be discussed below.

As shown in FIG. 1a, body portion 3 forms an interior chamber 3g that houses a holder 4. The holder 4 is also preferably made of inert plastics. Holder 4 includes first and second cradles 4a and 4b. Holder 4 also includes openings 4c to allow easy removal of holder 4 from body portion 3. Cradle 4a holds a chemical agent containing CAIS container 5, while cradle 4b securely holds a chemical reagent container 6 which contains reagents useful for treating and/or neutralizing chemical agents contained in the CAIS 5. CAIS container 5 can be in the shape of bottles or ampoules. Reagent container 6 holds a quantity of treatment reagent sufficient to neutralize the identified CAIS agents in container 1.

As shown in FIG. 1b if container 5 is in the shape of an ampoule, a third securing cradle 4d is utilized to hold the ampoule in place.

Alternative cradle designs were evaluated which allowed three to five ampoules to be treated at the same time. The current standard quantity of reagent was found sufficient to treat this larger quantity of ampoules.

In a closed position, as shown in FIG. 1c, a plurality of bolts B are positioned through apertures 2a and 3a (not shown) to secure lid portion 2 to body portion 3 and provide an air tight/contaminant impermeable seal between the container 1 and the environment.

Figure 2:
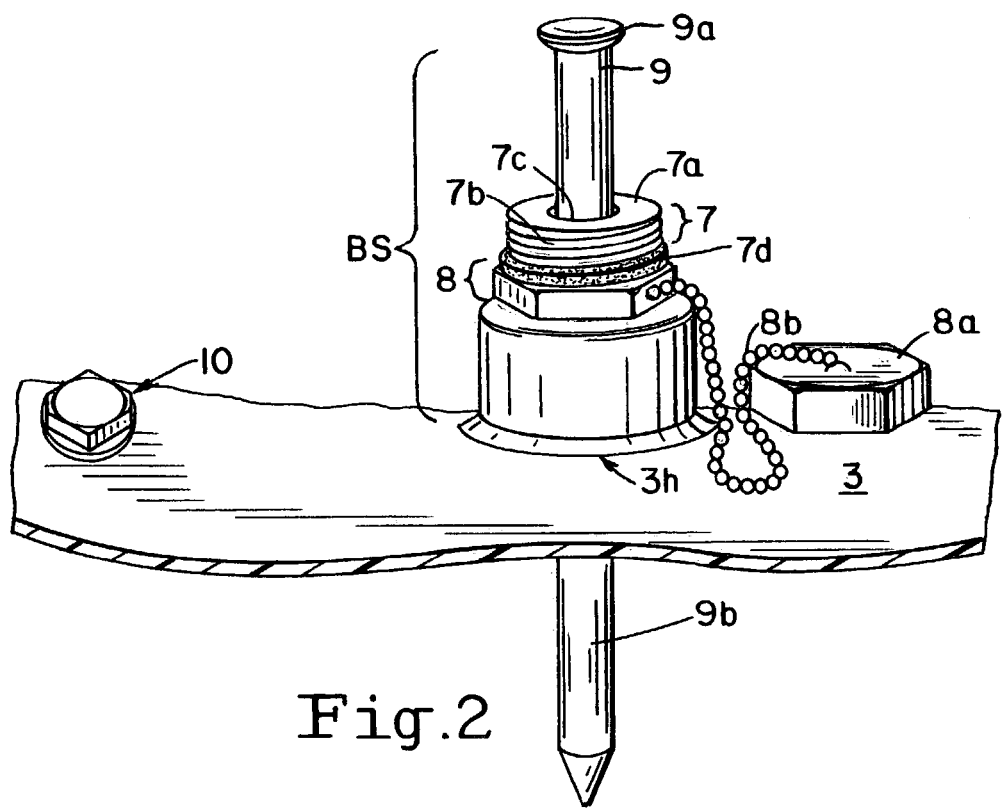
FIG. 2 shows the break mechanism and sample port of the present invention.

The exterior surface of body portion 3, as shown in FIG. 2, includes an opening 3h that is connected to a break system BS. The break system BS includes a screw bolt 7 having a top section 7a, a screw portion 7b and a notched section 7c connected to flexible seal 7d. The break system BS also includes a closing mechanism 8 that is connected to the screw bolt 7. The closing mechanism 8 includes a cap 8a that is connected to the closing mechanism 8 through a chain 8b. The cap 8a is internally threaded so as to mate with screw bolt 7 and engage flexible seal 7d. Attaching cap 8a to the closing mechanism 8 allows for cap 8 to be quickly fitted over screw bolt 7. Additionally, the break system BS includes a solid metal break rod 9 having a flat top end 9a and a pointed bottom end 9b. The break rod 9 is configured so that bottom end 9b is inserted into the container 1 through opening 3h when notched section 7c is pierced. Once break rod 9 is inserted through the screw bolt 7, the closing mechanism 8 forms an air-tight/contaminant impermeable seal between the container 1 and the environment. Also as shown in FIG. 2, the body portion 3 houses at least one sample valve 10. A sample probe (not shown) is inserted into sample valve 10 so that reaction conditions inside container 1 can be monitored. The sample valve 10 is configured to form an air tight/contaminant impermeable seal in its closed position and also when sample probes are inserted. Exemplary sample probes include thermocouples.

Figure 2A:
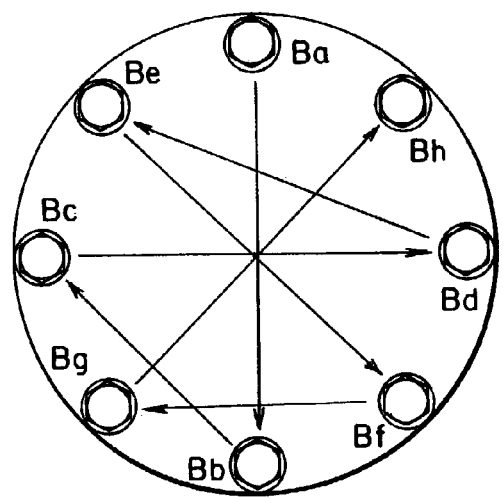
FIG. 2a shows an exemplary torque mechanism of the present invention.

2. Method of Use:

In use, bolts B are removed and the flanged lid portion 2 is lifted, making sure that o-ring 3d is not dislodged from groove 3c. The lid portion 2 is removed using handle portion 2b. Thereafter, break rod 9 is placed so that it is fully extended out of container 1. To facilitate this position, break rod 9 is grasped and pulled from the chamber 3g. Using openings 4c, holder 4 is removed so that the CAIS container 5 and the reagent container 6 can be positioned in chamber 3g of container 1. Holder 4 is then inserted into chamber 3g so that the CAIS container 5 is held within first cradle 4a and the reagent container 6 is held within second cradle 4b (for ampoules, the third cradle 4d is also utilized). Thereafter, lid portion 2 is repositioned over bottom portion 3 making sure that o-ring 3d is correctly positioned in groove 3c. Bolts B are fastened to provide proper torque to seal lid portion 2 to body portion 3 over container 1. Emphasis is placed upon proper torque to maintain and airtight seal and optimum reaction conditions during the neutralization process. FIG. 2a shows an exemplary fastening pattern for an 8-bolt system, where the bolts $B_a$ through $B_h$ are sequentially torqued beginning with bolt $B_a$ and ending with bolt $B_h$.

Figures 2B, 2C:
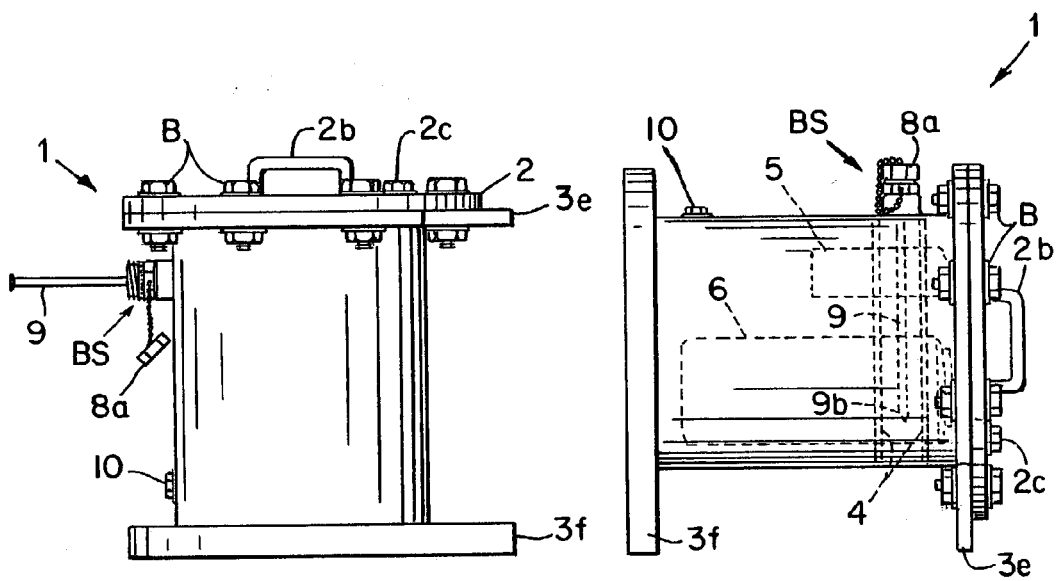
FIG. 2b shows the vertical position of the container of the present invention.
FIG. 2c shows the horizontal position of the container of the present invention.

Thereafter, container 1 is moved using handle 2b, from a vertical position as shown in FIG. 2b to a horizontal position as shown in FIG. 2c, where upper and lower rims 3e and 3f become stabilizing legs. Sample probes are attached at valves 2c and 10 so that reaction conditions can be monitored. The break rod 9 is then driven down into the container 1 such that bottom portion 9b pierces through CAIS container 5 and reagent container 6, held within holder 4. Thereafter, cap 8a is fastened, to prevent contaminants or reaction fluids from escaping the container 1. Container 1 is then again shifted to the vertical position as shown in FIG. 2b to allow the chemicals from containers 5 and 6 to mix for a desired reaction time. Once reaction is complete, container 1 can be placed within a Department of Transportation (DOT) certified shipping container, and shipped to permitted hazardous waste management facilities for ultimate disposal. The unit is designed to be disposable and as a safety feature is specifically designed to weaken and leak before it explodes in an incinerator.

A variety of treatment agents can be used depending upon the chemical agent stored in container 5. Table 1, below, provides a preferred list of chemical reagents that are useful. It is understood that the listed neutralizing reagents are exemplary and any reagents capable of working within the confines of the CANS system are also within the scope of this invention.

3. Reagents Utilized:

The following is a list of alternative treatment reagents found to be useful in the present CANS system:

TABLE 1

Monoethanolamine (MEA)
20% Sodium persulfate (SPS), aqueous.
20% Magnesium monoperoxyperphthalate (MMPP), aqueous.
14% Sodium percarbonate (SPC), aqueous.
15% Hydrogen peroxide (HP), aqueous.
10% Calcium hypochlorite (High Test Hypochlorite (HTH), aqueous.

Table 2 provides concentration data for neutralizing mustard and Lewisite chemical warfare agents using the reagent 1,3-Dichloro-5,5-dimethylhydantoin (DCDMH).

TABLE 2

| Process | Use | Reagents |
|---|---|---|
| Red | Nitrogen Mustard (HN-1 only) Sulfur mustard (H/HD) Lewisite (L) in chloroform solution | DCDMH 0.555 molar in a mixture of chloroform (45%), t-butyl alcohol (48.5%), water (3%) |
| Blue | Sulfur Mustard (H/HD) | DCDMH 0.555 molar in a mixture of chloroform (48.5%), t-butyl alcohol (48.5%), water (3%) |
| Charcoal | Nitrogen Mustard or Sulfur Mustard absorbed on charcoal | DCDMH in chloroform (0.91 M) |
| Charcoal-L | Lewisite absorbed on charcoal | DCDMH 0.555 molar in a mixture of chloroform (48.5%), t-butyl alcohol (48.5%), water (3%) |

Of course, concentrations of reagents can be modified significantly and remain effective for neutralizing the toxic chemical agents.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiments, those alternatives which have been discussed above, and all equivalents thereto.

What is claimed is:

1. A chemical-agent access and neutralization system, comprising:
   a container having a flanged lid portion and a body portion;
   means for attaching and sealing said lid portion to said body portion to form an interior chamber; and wherein said interior chamber further includes a holder, said holder having a first and second cradle, said first cradle constructed so as to hold a chemical agent container housing a chemical agent, and said second cradle constructed so as to hold a chemical reagent container housing a neutralizing agent.

2. The chemical agent access and neutralization system as recited in claim 1, wherein said means for attaching and sealing said lid portion to said body portion further comprises said body portion having a flat upper portion wherein said flat upper portion includes a plurality of apertures, said apertures positioned circumferentially around an outer edge of said flat upper portion, and said flanged lid portion including a plurality of apertures wherein said plurality of apertures are positioned so as to correspond to said apertures of said flat upper portion.

3. The chemical agent access and neutralization system as recited in claim 2, further comprising a plurality of bolts, said bolts constructed so as to threadably engage within said plurality of apertures of said flanged lid portion and said flat upper portion of said body, so as to secure said flanged lid portion to said upper portion in an airtight and contaminant impermeable manner.

4. The chemical agent access and neutralization system as recited in claim 2, wherein said flat upper portion further includes a groove, said groove housing an o-ring to form an airtight and contaminant impermeable seal between said flanged lid portion and said body portion.

5. The chemical agent access and neutralization system of claim 1, wherein said means for attaching and sealing said lid portion to said body portion comprises a clamp.

6. The chemical agent access and neutralization system as recited in claim 1, wherein said flanged lid portion further comprises a handle and at least one sample valve, said sample valve constructed so as to allow a sample probe to be inserted therethough to monitor conditions within said interior chamber.

7. The chemical agent access and neutralization system as recited in claim 1, wherein an exterior surface of said body portion houses a break system and at least one sample valve; said break system comprising a screw bolt having a notched section, a flexible seal, a break rod and a closing mechanism, said break rod constructed so as to pierce said notched section, penetrate said interior chamber, and pierce said chemical agent container and said reagent container; said sample valve constructed so as to allow a sample probe to be inserted therein for monitoring conditions within said interior chamber.

8. The chemical agent access and neutralization system as recited in claim 7, wherein said closing mechanism comprises a cap having an internally threaded portion and a chain, said cap constructed so as to threadably engage and cover said screw bolt and said flexible seal so as to form an airtight contaminant impermeable seal between said break mechanism and environment.

* * * * *